United States Patent
Kolandavelu et al.

(10) Patent No.: US 9,959,158 B2
(45) Date of Patent: May 1, 2018

(54) METHODS AND APPARATUS FOR THE CREATION AND USE OF REUSABLE FAULT MODEL COMPONENTS IN FAULT MODELING AND COMPLEX SYSTEM PROGNOSTICS

(71) Applicant: HONEYWELL INTERNATIONAL INC., Morris Plains, NJ (US)

(72) Inventors: Raghupathy Kolandavelu, TamilNadu (IN); Tim Felke, Damascus, MD (US); MoghanaPriya Kesavan, Karnataka (IN); Ramchandra Reddy K, Telangana (IN); Tim Mahoney, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 168 days.

(21) Appl. No.: 14/881,772

(22) Filed: Oct. 13, 2015

(65) Prior Publication Data
US 2017/0102982 A1 Apr. 13, 2017

(51) Int. Cl.
*G06F 11/07* (2006.01)
(52) U.S. Cl.
CPC ........ *G06F 11/079* (2013.01); *G06F 11/0751* (2013.01); *G06F 11/0787* (2013.01)
(58) Field of Classification Search
CPC ............... G06F 11/3447; G06F 11/079; G06F 11/0751; G06F 11/0787
See application file for complete search history.

(56) References Cited

U.S. PATENT DOCUMENTS

| 5,067,099 | A | * | 11/1991 | McCown | G06F 11/2257 700/30 |
| 5,453,933 | A | | 9/1995 | Wright et al. | |
| 5,796,990 | A | | 8/1998 | Erle et al. | |
| 5,919,267 | A | * | 7/1999 | Urnes | G06F 11/0736 714/26 |
| 6,760,639 | B2 | | 7/2004 | Kallela et al. | |

(Continued)

FOREIGN PATENT DOCUMENTS

| EP | 2613212 A1 | 7/2013 | |
| EP | 2728429 A2 * | 5/2014 | ......... G06F 17/5009 |

(Continued)

OTHER PUBLICATIONS

USPTO Final Office Action for U.S. Appl. No. 13/947,818 dated Apr. 21, 2016.
(Continued)

*Primary Examiner* — Yolanda L Wilson
(74) *Attorney, Agent, or Firm* — Lorenz & Kopf, LLP

(57) ABSTRACT

A method for creating and using a fault model representative of a system, the fault model comprising one or more fault model components is provided. The method creates a reusable fault model component; associates one or more algorithms to the reusable fault model component, the one or more algorithms describing behavior of the reusable fault model component; incorporates the reusable fault model component and the one or more algorithms into the fault model; tunes the reusable fault model component, using available data associated with the fault model; and predicts occurrence of degradation of the system, based on the tuning.

20 Claims, 12 Drawing Sheets

(56) References Cited

U.S. PATENT DOCUMENTS

| | | | |
|---|---|---|---|
| 6,766,230 B1 | 7/2004 | Rizzoni et al. | |
| 6,952,658 B2 | 10/2005 | Greulich et al. | |
| 7,246,290 B1* | 7/2007 | Green | G05B 23/0243 324/762.01 |
| 8,204,719 B2* | 6/2012 | Diao | G06F 11/3447 703/2 |
| 2002/0022952 A1 | 2/2002 | Zager | H04L 41/0233 703/22 |
| 2002/0038449 A1 | 3/2002 | Green et al. | |
| 2003/0139905 A1* | 7/2003 | Helsper | G06F 11/3006 702/182 |
| 2004/0143778 A1* | 7/2004 | Vollmar | G05B 17/02 714/37 |
| 2004/0153928 A1 | 8/2004 | Rohrbaugh et al. | |
| 2007/0005311 A1* | 1/2007 | Wegerich | G05B 23/0254 703/2 |
| 2007/0288885 A1 | 12/2007 | Brunel et al. | |
| 2008/0109390 A1* | 5/2008 | Iszlai | G06F 11/3447 706/14 |
| 2008/0263152 A1 | 10/2008 | Daniels et al. | |
| 2008/0029733 A1 | 12/2008 | Khuzadi | |
| 2009/0006063 A1* | 1/2009 | Sedukhin | G06F 11/3447 703/13 |
| 2009/0204267 A1 | 8/2009 | Sustaeta et al. | |
| 2009/0326758 A1 | 12/2009 | Ramanathan et al. | |
| 2010/0083248 A1* | 4/2010 | Wood | G06F 9/5077 718/1 |
| 2010/0205483 A1* | 8/2010 | Ishiou | G06F 11/0709 714/26 |
| 2014/0088766 A1 | 3/2014 | Tang et al. | |
| 2014/0107993 A1 | 4/2014 | Cheng | |
| 2015/0025866 A1 | 1/2015 | vanderzweep et al. | |
| 2015/0089294 A1* | 3/2015 | Bell | G06F 11/08 714/37 |
| 2017/0102982 A1* | 4/2017 | Kolandavelu | G06F 11/079 |

FOREIGN PATENT DOCUMENTS

| | | |
|---|---|---|
| EP | 2829934 A2 | 1/2015 |
| WO | 2008154097 A1 | 12/2008 |
| WO | 2013040043 A1 | 3/2013 |

OTHER PUBLICATIONS

USPTO Office Action for U.S. Appl. No. 13/947,818 dated Dec. 23, 2016.
Extended EP Search Report for Application No. 16193404.7-1802 dated Feb. 20, 2017.
Wang, J. et al.; Fault Model Libraries for Safety Analysis and Their Ontology-based Reuse, 2012 Eighth International Conference on Computational Intelligence and Security.
EP Extended Search Report for Application 14176363.1 dated Jan. 28, 2015.
Simeon, E.A., et al.; A Data-Driven Framework for Predicting the Remaining Useful Life of Hydroelectric Equipments; ABCM Symposium Series in Mechatronics—vol. 5 Copyright © 2012 by ABCM; Section III—Emerging Technologies and AI Applications.
Daigle, M. et al.; Multiple Damage Progression Paths in Model-based Prognostics; University of California, Santa Cruz, NASA Ames Research Center, Moffett Field, CA, USA.
Greitzer, F.L. et al.; Predicting Remaining Life of Mechanical Systems; Intelligent Ship Symposium IV PNNL-SA-34144; Apr. 2-3, 2001.
Fagogenis, G. et al.; Novel RUL Prediction of Assets based on the Integration of Auto-Regressive; Heriot-Watt University Ocean Systems Laboratory; 2014.
USPTO Office Action, Notification dated Dec. 21, 2015; U.S. Appl. No. 13/947,818.
USPTO Final Office Action for U.S. Appl. No. 13/947,818 dated May 18, 2017.

* cited by examiner

METHODS AND APPARATUS FOR THE CREATION AND USE OF REUSABLE FAULT MODEL COMPONENTS IN FAULT MODELING AND COMPLEX SYSTEM PROGNOSTICS

TECHNICAL FIELD

The present invention generally relates to fault modeling using a hierarchical structure of components, and more particularly but not exclusively, to the creation and use of reusable fault model components in prognostics applications for complex systems.

BACKGROUND

A fault model can be a central piece for a prognostic system used to predict component or system degradation. A fault model may be implemented as an engineering model of something that could go wrong in the operation of a piece of equipment, which is composed of assemblies and sub-assemblies. A fault model may be used to help users or systems to identify and isolate a problem that occurs within that piece of equipment in order to make decisions with regard to equipment design, assembly/sub-assembly choice and/or design, and to formulate action plans to accommodate potential failures.

Creating a prognostics solution for a complex system is time consuming and costly. The complexity of developing a solution stems from the need to develop algorithms at various stages and levels of the system monitored. The applicability of the algorithm for one type of part varies with the operating environment of the part, manufacturing defects inherent to the part, age of the part, etc. So, even if an algorithm is developed for a system considering the build-in parts and installation of the system, maintenance of the same becomes complex, due to the factors mentioned above. Hence the prognostics solutions were less adopted or at least adopted in pockets by the industry.

Accordingly, it is desirable to create a prognostics solution that is customizable and widely applicable to a broad range of components. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide A method for creating and using a fault model representative of a system, the fault model comprising one or more fault model components. The method creates a reusable fault model component; associates one or more algorithms to the reusable fault model component, the one or more algorithms describing behavior of the reusable fault model component; incorporates the reusable fault model component and the one or more algorithms into the fault model; tunes the reusable fault model component, using available data associated with the fault model; and predicts occurrence of degradation of the system, based on the tuning.

Some embodiments provide a method for using reusable sub-assemblies in a fault model associated with a system. The method incorporates a reusable sub-assembly into the fault model, the reusable sub-assembly representing a component of the system; and predicts potential faults of the system using the reusable sub-assembly.

Some embodiments provide a non-transitory, computer-readable medium containing instructions thereon, which, when executed by a processor, perform a method. The method adjusts parameters associated with a reusable fault model component of a fault model for a system, using real-time data produced by execution of the fault model; executes the fault model using the adjusted parameters, to produce adjusted output; and predicts remaining life of the system, based on the adjusted output.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used to create and employ reusable components within a fault model. Each reusable component includes distinct fault model characteristics and may be re-used an unlimited number of times in higher level assemblies. In certain embodiments, a component necessary to a given higher level assembly is chosen based on pre-defined failure criteria. When that component corresponds to an existing reusable fault model component, the reusable fault model component is incorporated into the fault model. When that component does not correspond to an already-existing reusable fault model component, then an appropriate reusable fault model component is created and incorporated into the fault model.

The subject matter presented herein also relates to methods used to incorporate reusable components and applicable prognostics algorithms into a fault model, and to "tune" the parameters associated with the reusable component to accurately predict potential faults resulting from degradation of the system. Recorded output data from hardware components associated with the software-modeled reusable components includes parameters that are used as input data for algorithms associated with each reusable component. Output of the algorithms is compared to stored fault data to correlate the parameters to predict, detect, and diagnose faults in the complex system.

Certain terminologies are used with regard to the various embodiments of the present disclosure. Prognostics assess the current health of a complex system and predict remaining life of the complex system and/or one or more components of the complex system. Algorithms associated with a reusable fault model component produce output defining behavior of the reusable fault model component. Degradation of a complex system or a component of the complex system may be indicated by a range of system behavior, to include reduced performance of the component and/or system, complete failure of the component and/or system, and system behavior falling between these extremes.

Creation and Use of Reusable Fault Model Components

Figure 1:
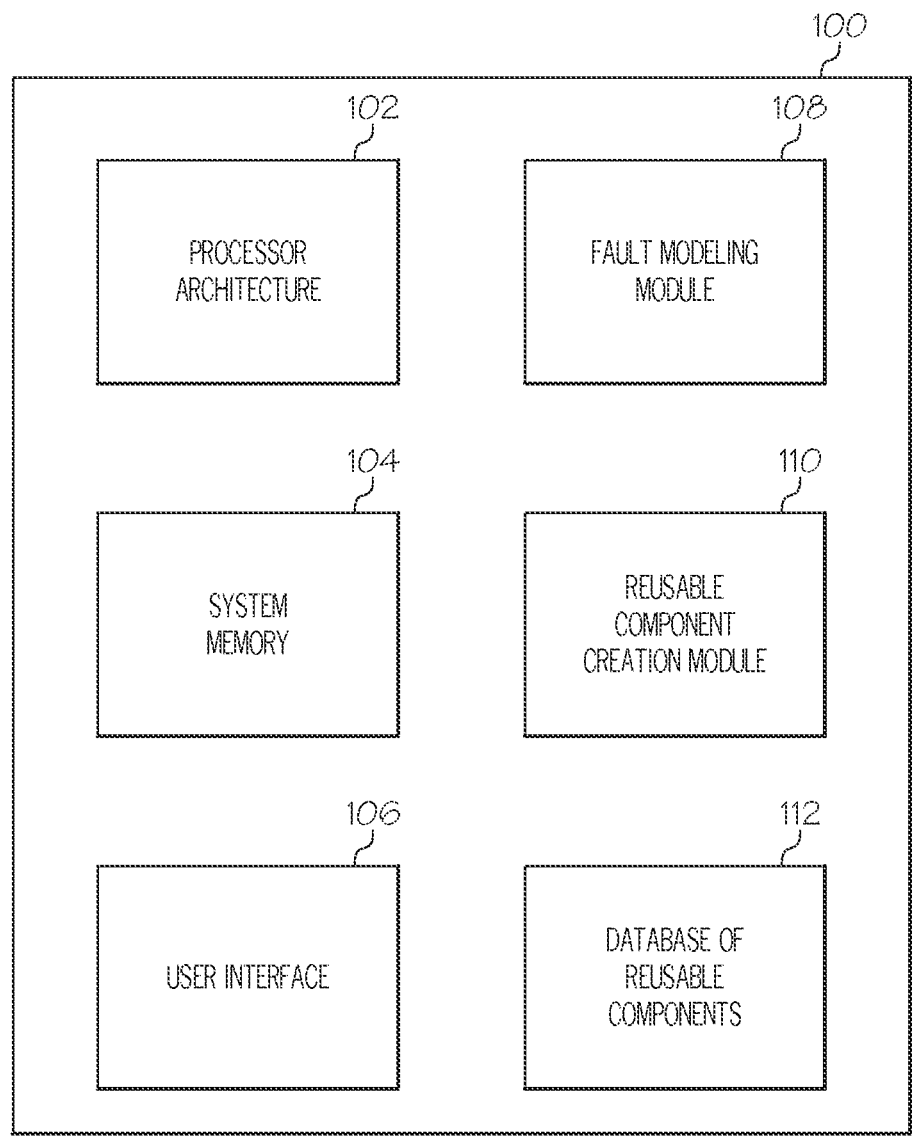
FIG. 1 is a schematic block diagram representation of a fault modeling system, according to some embodiments.

Referring now to the drawings, FIG. 1 is a functional block diagram of a fault modeling system 100. The fault modeling system 100 may be implemented using any desired platform. For example, the fault modeling system 100 could be realized as any of the following, without limitation: a desktop computer, a laptop computer, a server system, a mobile device, a specialized piece of diagnostic equipment, or any other device that includes a processor architecture 102.

The fault modeling system may include, without limitation: a processor architecture 102, system memory 104, a user interface 106, a fault modeling module 108, a reusable component creation module 110, and a database of reusable components 112. In practice, an embodiment of the fault modeling system 100 may include additional or alternative elements and components, as desired for the particular application. For example, additional components such as displays and user input components may be employed without departing from the scope of the present disclosure. For ease of illustration and clarity, the various physical, electrical, and logical couplings and interconnections for these elements and features are not depicted in FIG. 1.

Moreover, it should be appreciated that embodiments of the fault modeling system 100 will include other elements, modules, and features that cooperate to support the desired functionality. For simplicity, FIG. 1 only depicts certain elements that relate to the fault modeling techniques described in more detail below.

The processor architecture 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems.

The processor architecture 102 is in communication with system memory 104. The system memory 104 represents any non-transitory short or long term storage or other computer-readable media capable of storing programming instructions for execution on the processor architecture 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the processor architecture 102 could receive and cooperate with external computer-readable media that is realized as a portable or mobile component or application platform, e.g., a portable hard drive, a USB flash drive, an optical disc, or the like.

The user interface 106 accepts information from a user of the fault modeling system 100, including information necessary to building and utilizing a fault model, including fault model components. User interface 106 may include any means of transmitting user input into the fault modeling system, to include without limitation: a computer keyboard, mouse, touch-pad, and/or trackball and screen; a touch-screen device; or the like.

The fault modeling module 108 is suitably configured to create fault models, analyze fault models, and perform a variety of tasks relating to fault modeling. The fault modeling module 108 provides detail regarding a component of interest, including basic functionality of the component, behavior of the component when it fails, appearance and characteristics of the component during failure, and the like. In the context of this invention, a fault model consists of descriptive data for an asset that provides the information needed by automated maintenance support systems, for which numerous published standards for operation exist (such as IEEE 13374, ARINC 624, etc.).

In certain embodiments, the fault modeling module 108 utilizes a hierarchical organization of items within a fault model, which may be applied to hardware components, software components, systems, configuration/personalization mechanisms, inter-element interfaces, and the like. This hierarchical organization may include the following levels, without limitation: component types, standard components, component specifications, and component implementations.

At the component type level, the fault model records aspects of the fault model that are required for subordinate items of that component type. For example, fault models for elements that belong to the Electrical Controller component type are required to provide standard failure modes, range checks for all interfaces, and degradation equations, but are not required to provide performance equations. However, in another example, fault models for elements that belong to the Mechanical Actuator component type are required to provide all of the included features of the Electrical Controller component type, to include performance equations.

At the standard component level, the fault model records generic versions of equations and monitor definitions that encode the structure of equations and monitors, but leaves the specification of parameters of the equations and binding to specific input/output (I/O) to lower levels. At the component specification level, the fault model records some of the parameters of the equations and the binding to specific I/O. At the component implementation level, the fault model records failure rates, symptom occurrence rates, and remaining equation parameters.

In practice, the fault modeling module 108 may be implemented with (or cooperate with) the processor architecture 102 to perform at least some of the functions and operations described in more detail herein. In this regard, the fault modeling module 108 may be realized as suitably written processing logic, application program code, or the like.

Based upon input received via the user interface 106 and information obtained via the fault modeling module 108, the fault modeling system 100 determines components necessary for incorporation into a fault model in various stages of completion and/or testing. The reusable component creation module 110 creates complete and/or incomplete reusable components for incorporation into the current fault model of the fault modeling module 108. The structure of the overall fault model, created by the fault modeling module 108, allows for some, or all, of the fault model components for any given assembly to be "generalized". For example, "Valve ABC version 1" at the component implementation hierarchical level (as described with regard to the fault modeling module 108) may include all characteristics and properties of a generic valve, but also include characteristics and properties specific to "Valve ABC version 1", which may not be shared amongst all valves in the assembly. A reusable component may be created using the properties of "Valve ABC version 1" that are common to all valves, effectively "generalizing" the component implementation.

These "generalized" fault model components can be re-used in multiple locations on a single asset or re-used across many different assets. The fault modeling module 108 interacts with the user, through the generalization process, to convert installation specific input, output, and variable references into generic equivalents, and to record information for each of these interfaces so that the fault modeling module 108 can assist future users in accurately connecting the reusable component into installation locations on other higher level assemblies and assets.

In certain embodiments, reusable components of the fault model are created at the component specification hierarchical level (as described with regard to the fault modeling module 108). In some embodiments, however, reusable components of the fault model may be created at the component implementation level. In either case, the "generalization" process occurs when looking to a higher level of the hierarchy to determine what properties are shared among all applicable components.

In practice, the reusable component creation module 110 may be implemented with (or cooperate with) the processor architecture 102 to perform at least some of the functions and operations described in more detail herein. In this regard, the reusable component creation module 110 may be realized as suitably written processing logic, application program code, or the like.

The database of reusable components 112 may be implemented in system memory 104 and/or elsewhere, including external memory devices (described above in relation to potential implementations of system memory 104). In certain embodiments, the database of reusable components 112 is maintained continuously and is utilized in the creation of a range of fault models. In this case, the database of reusable components 112 may include components applicable to creating and using fault models for a diverse range of assemblies. In other embodiments, the database of reusable components 112 is maintained for fault models of a certain category only. For example, the database of reusable components 112 may be kept for creating fault models of automobiles, while a separate and distinct database of reusable components (not shown in FIG. 1) may be kept for creating fault models of aircraft.

Figure 2:
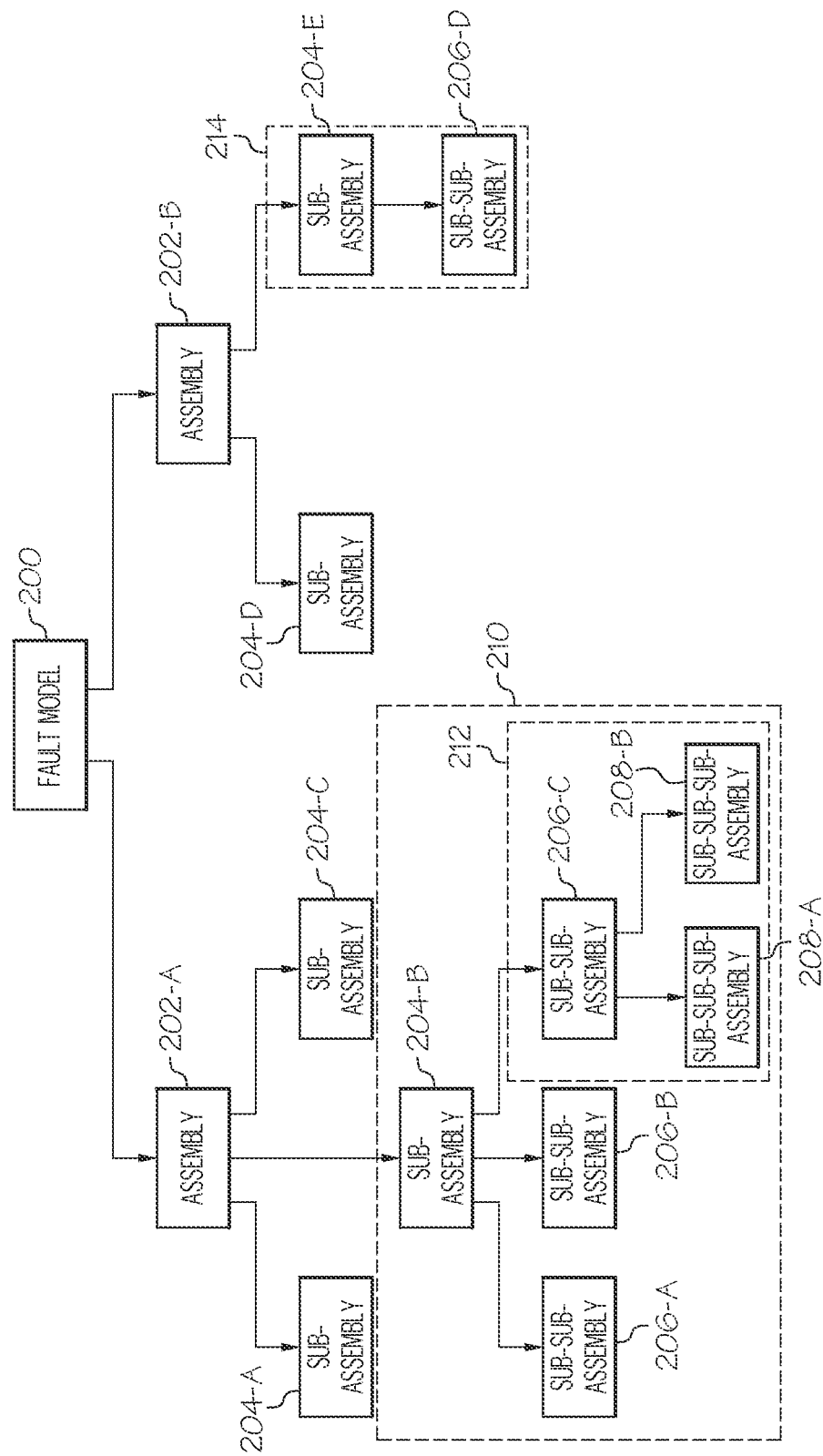
FIG. 2 is a hierarchical diagram representation of a fault model, according to some embodiments.

FIG. 2 is a hierarchical diagram representation of a fault model, according to some embodiments. The fault model 200 structure illustrated may belong to any piece of equipment, having multiple components, for which a fault model 200 is desired. A fault model 200 generally illustrates detail regarding the functionality of an assembly: how the assembly works, how the assembly fails, and what the assembly looks like when it fails. A fault model 200 may include, without limitation, one or more assemblies 202; one or more sub-assemblies 204; one or more sub-sub-assemblies 206; and one or more sub-sub-sub-assemblies 208. It should be appreciated that any number of layers of assemblies, sub-assemblies, etc. may be used, as appropriate for the physical system, device, or assembly that is the subject of the fault model.

Generally, the term "asset" is used for a top level assembly for which a completed fault model 200 is deployed to support automated maintenance functions. In contrast, an assembly 202 may be defined as a lower level model which contains the same information and structure as an asset, but is not deployed to support automated maintenance functions. Instead, assembly level models are integrated together to create asset level models. It is possible that the providers of complex products like engines, avionic suites and environmental control systems will consider these to be assets and provide automated maintenance support accordingly while a vehicle integrator will treat them as assemblies. This is possible because the invention allows a data package to exist in more than one modeling environment with different roles (asset/assembly) in each.

As shown in FIG. 2, the assemblies (202-A, 202-B) represent the highest level parts, pieces, or subsets, which have been integrated together to form the fault model 200. Examples of an assembly may include, without limitation: transportation apparatus (e.g., vehicles), mechanical devices, electronic devices, or any system or device for which it is desired to utilize a fault model. An assembly may include one or more components, called sub-assemblies. (The term "component" is used herein to generically refer to any part of the fault model.) A sub-assembly may include one or more sub-sub-assemblies. This organizational model applies to all components that exist within a fault model hierarchy. Each assembly 202 may include one or more sub-assemblies 204, which are automatically included in any fault model 200 in which the assembly 202 is included. Further, each sub-assembly 204 may include one or more sub-sub-assemblies 206, which are automatically included in any assembly 202 in which the sub-assembly 204 is included. Each component, whether it is an assembly 202, sub-assembly 204, sub-sub-assembly 206, or any other component, carries with it all of its sub-components when incorporated into a higher level component. For example, sub-assembly 204-E, when incorporated into assembly 202-

B, includes all components shown in border 214. In this case, when sub-assembly 204-E is used, it will always include sub-sub-assembly 206-D.

As another example, sub-assembly 204-B, when incorporated into assembly 202-A, includes all components shown in border 210. In this case, when sub-assembly 204-B is used, it will always include sub-sub-assemblies 206-A, 206-B, and 206-C, along with sub-sub-sub-assemblies 208-A and 208-B. If sub-assembly 204-B is removed from the fault model 200, all components shown in border 210 would automatically be removed as well.

In a final example, sub-sub-assembly 206-C, when incorporated into sub-assembly 204-B, includes all components shown in border 212. In this case, when sub-sub-assembly 206-C is used, it will always include sub-sub-sub-assemblies 208-A and 208-B. Sub-sub-assembly 206-C may be removed from the fault model 200, which would automatically remove sub-sub-sub-assemblies 208-A and 208-B, but would not disturb any of the other components of the fault model 200.

Additionally, certain components of the fault model 200 may be designated as reusable components, regardless of the level at which each component is located in the fault model hierarchy (i.e., whether the component is an assembly 202, sub-assembly 204, sub-sub-assembly 206, etc.). All components are not required to be reusable components in order for the fault model 200 to take advantage of reusability for one or more components. Similar to the structural rules described above, when a reusable component is incorporated into a fault model 200, all sub-components belonging to the reusable component are "folded into" the component and, as a consequence, are also incorporated into the fault model 200. By definition, any and all sub-components of a reusable component will also be reusable.

In this example, sub-sub-assembly 206-C may be designated as a reusable component. As shown, sub-sub-assembly 206-C has multiple sub-components that are reused when the sub-sub-assembly 206-C is incorporated into another assembly. If this is the case, sub-sub-assembly 206-C will have an assigned part number or an identifier indicating that it is a reusable component. Sub-sub-assembly 206-C is also a lower-level subcomponent of sub-assembly 204-B, which may be designated as a reusable component itself. If this is the case, sub-assembly 204-B will also have an assigned part number indicating that it is a reusable component. Here, if sub-assembly 204-B is moved, all of its subcomponents will move with it, including sub-sub-assembly 206-C. In the first scenario, sub-sub-assembly 206-C is a standalone reusable component. In the second scenario, sub-sub-assembly 206-C is an attached subcomponent of reusable component, sub-assembly 204-B.

To illustrate this concept, an example of a Lane Departure Radar (LDR) device, commonly associated with an automobile assembly, is given. An LDR may be a standalone reusable component, incorporated into an automobile assembly or any other higher level component on its own. Alternatively, an LDR may be a part of an automobile Safety System reusable component, where the LDR is merely a portion of the overall reusable component, which may be incorporated into any higher level component.

Figure 3:
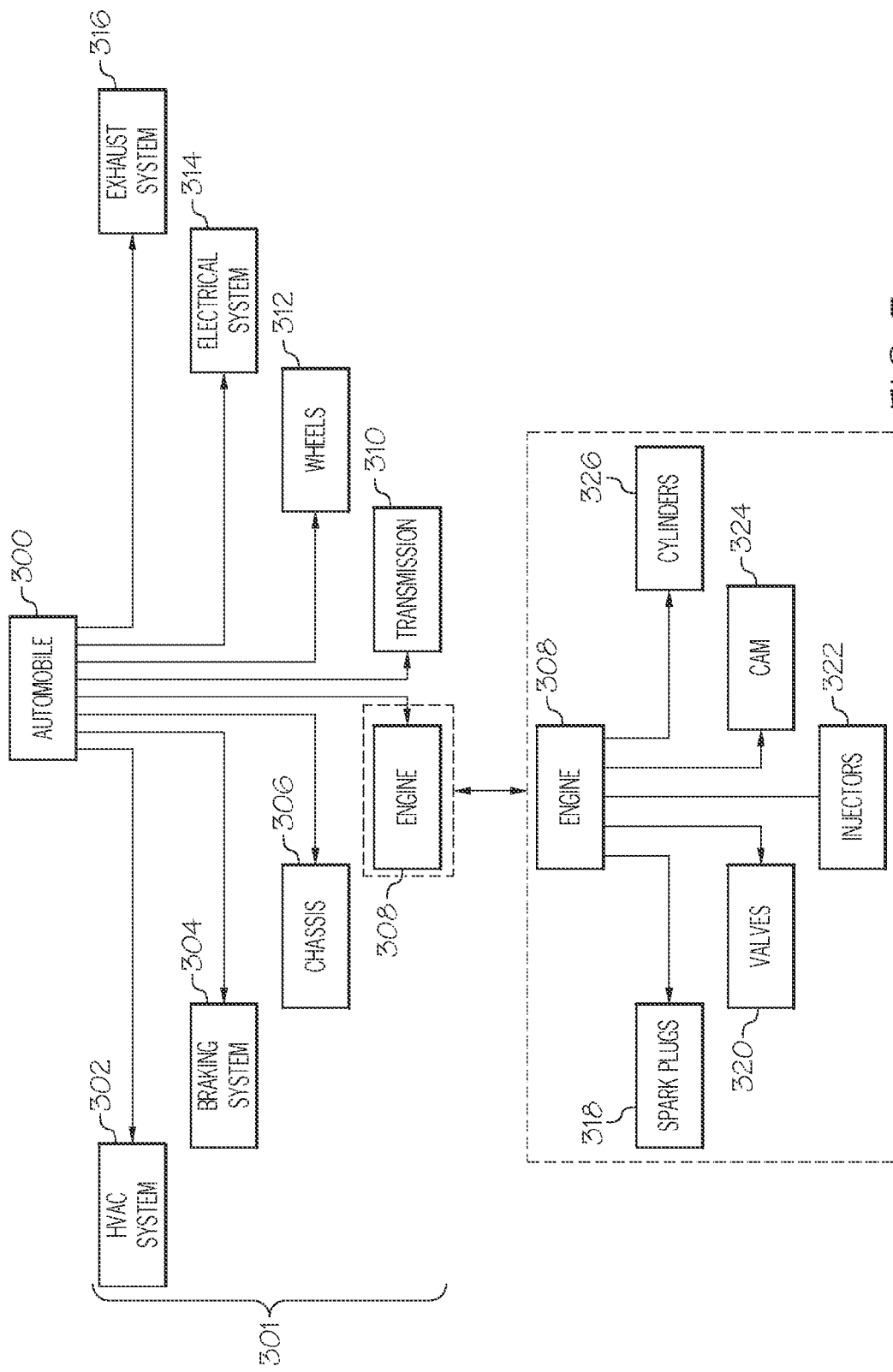
FIG. 3 is a hierarchical diagram representation of a fault model, as applied to an automobile, according to some embodiments.

FIG. 3 is a hierarchical diagram representation of a fault model, as applied to a vehicle, according to some embodiments. This diagram illustrates a specific example of an automobile assembly 300. The automobile assembly 300 contains, without limitation, the following sub-assemblies: a heating, ventilating, and air conditioning (HVAC) system 302; a braking system 304; a chassis 306; an engine 308; a transmission 310; wheels 312; an electrical system 314; and an exhaust system 316. These sub-assemblies of the automobile assembly 300 may be operatively associated with one another or otherwise configured to cooperate with one another as needed to support the desired functionality—in particular, the fault modeling functionality described herein. For ease of illustration and clarity, the various logical couplings and interconnections for these elements and features are not depicted in FIG. 3. Moreover, it should be appreciated that embodiments of the automobile assembly 300 will include other assemblies, sub-assemblies, sub-sub-assemblies, etc., that cooperate to support the desired functionality. For simplicity, FIG. 3 only depicts certain sub-assemblies that relate to the fault modeling of the vehicle described in more detail below.

As shown, the sub-assemblies 301 are components of the automobile assembly 300. Each of the sub-assemblies 301 may be further broken down into its own components, which are included in any assembly into which the sub-assembly 301 is incorporated. For example, the engine sub-assembly 308 includes all of its own components, including, without limitation: spark plugs 318, valves 320, injectors 322, cam 324, and cylinders 326, as shown in FIG. 3. When the engine sub-assembly 308 is incorporated into the automobile assembly 300, or any other assembly of any other fault model, the engine sub-assembly 308 brings with it all of its own components. The same principle applies to other assemblies, sub-assemblies, sub-sub-assemblies, and other components at any level within the assembly/sub-assembly hierarchy. When a component is integrated into a higher level assembly, all of its component parts (or sub-components) are also included in the integration.

Figure 4:
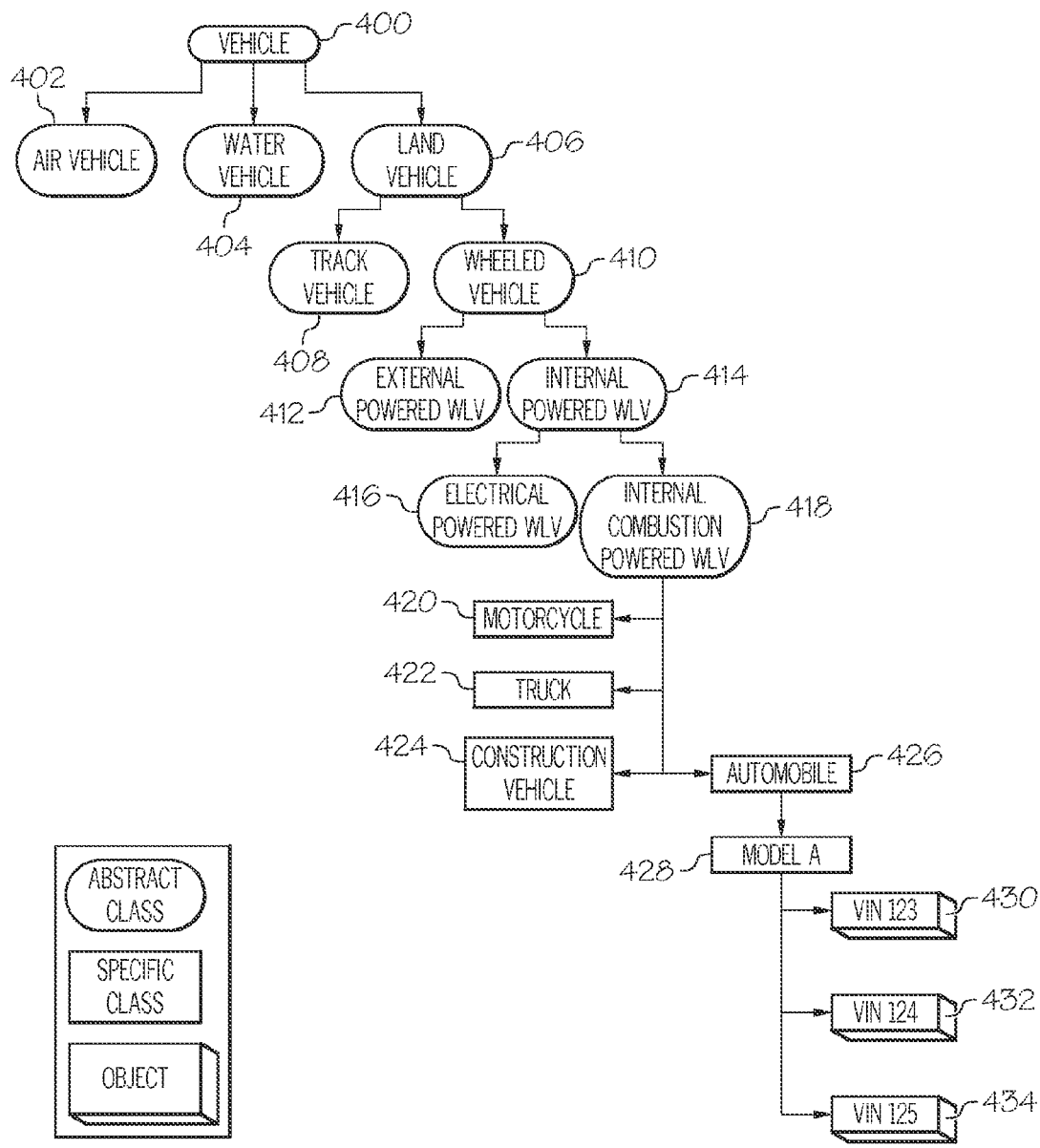
FIG. 4 is a chart that illustrates inheritance, as applied to vehicle fault model design, according to some embodiments.

FIG. 4 is a chart that illustrates inheritance, as applied to vehicle fault model design, according to some embodiments. Inheritance defines the relationships between abstract classes, specific classes, and objects. An abstract class defines the attributes and content of an entity. Abstract classes do not have the capability to be instantiated, but are used by sub-classes to inherit the attributes and content that are common to all sub-classes of the abstract class. The inheritance chart begins at the top with abstract class vehicle 400. In this example, the abstract class vehicle 400 defines characteristics of a vehicle to be used by all sub-classes of abstract class vehicle 400. Abstract class vehicle 400 cannot be instantiated, and does not define a vehicle that may be created based only on its characteristics. However, the attributes defined by abstract class vehicle 400 may be used by sub-classes, in combination with other chosen attributes, to define a more specific vehicle that may be instantiated.

Here, the abstract class vehicle 400 is used to create abstract classes air vehicle 402, water vehicle 404, and land vehicle 406, which are all sub-classes of abstract class vehicle 400. Abstract class land vehicle 406 is used to create abstract classes track vehicle 408 and wheeled vehicle 410. Abstract class wheeled vehicle 410 is used to create abstract classes external powered wheeled vehicle (WLV) 412 and internal powered WLV (414). Abstract class internal powered WLV 414 is used to create abstract classes electrical powered WLV 416 and internal combustion powered WLV 418.

Abstract class internal combustion WLV 418 is used to create specific classes motorcycle 420, truck 422, construction vehicle 424, and automobile 426. A specific class has the same capabilities as an abstract class (e.g., defining the attributes of an entity), but a specific class also has the capability of allowing objects (i.e., instances) of the specific class to be instantiated. Here, specific class automobile 426 is used to create specific class Model A 428. Specific class Model A 428 is used to create objects VIN 123 (430), VIN 124 (432), and VIN 125 (434). An object is an instance of a specific, or instantiable, class, including defined attributes that may have merely been characterized (but not instantiated) in the specific class from which the object is instantiated.

As applied to fault modeling in the context of this application, abstract classes may be realized at the component type or standard component levels (as described with regard to FIG. 1). Specific classes may be realized at the component specification level, and objects may be realized at the component implementation level.

Figure 5:
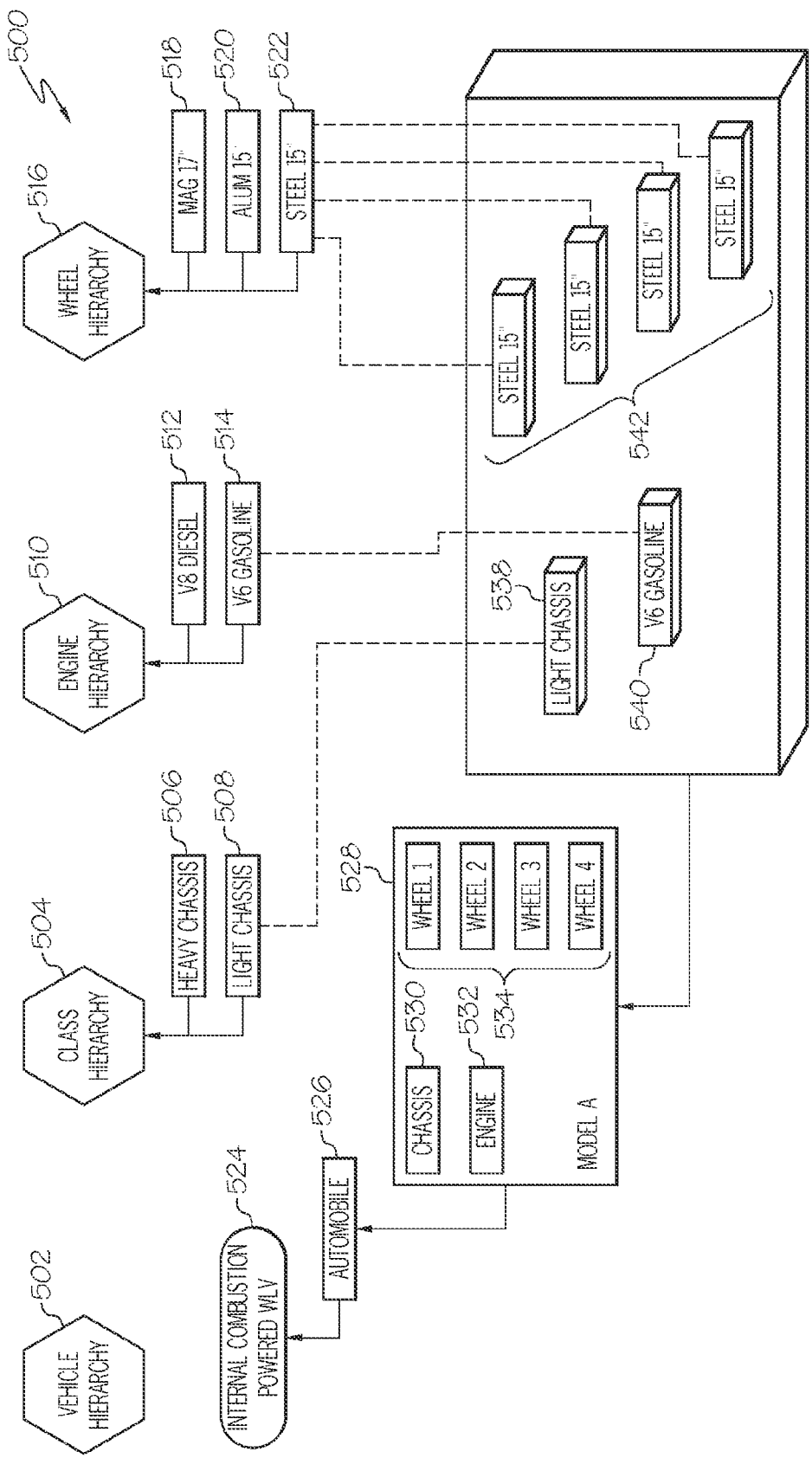
FIG. 5 is a chart that illustrates a specific example of inheritance, as applied to vehicle fault model design, according to some embodiments.

FIG. 5 is a chart that illustrates a specific example of inheritance, as applied to vehicle fault model design, according to some embodiments. This inheritance example begins with a representation of a condensed vehicle hierarchy 502, which corresponds to the vehicle hierarchy 400 illustrated in FIG. 4. Additional component hierarchies shown for purposes of this example include a chassis hierarchy 504 (including specific classes heavy chassis 506 and light chassis 508); an engine hierarchy 510 (including specific classes V8 Diesel 512 and V6 Gasoline 514); and a wheel hierarchy 516 (including specific classes Mag 17" 518, Alum 15" 520, and Steel 15" 522).

The abstract class internal combustion WLV 524 corresponds to abstract class internal combustion WLV 418 shown in FIG. 4, and is used to create specific class automobile 526, which corresponds to specific class automobile 426 of FIG. 4. Specific class automobile 526 is then used to create specific class Model A 528, which corresponds to specific class Model A 428 shown in FIG. 4. As shown, for purposes of this example, specific class Model A 528 is defined to include a chassis 530, an engine 532, and four wheels 534. These defined vacancies may be referred to as "slots", indicating a place within a class or object that has been earmarked to contain a specified component or category of component.

Specific class Model A 528 is then used to create object VIN 123 (536), which corresponds to object VIN 123 (430) in FIG. 4. As shown, object VIN 123 (536) includes all of the components required by specific class Model A 528, and instantiates Model A 528 with actual components meeting the required criteria of each slot defined by specific class Model A 528. For example, the vacant slot defined to contain a chassis 530 in specific class Model A 528 is "filled" using object Light Chassis 538 in object VIN 123 (536). Similarly, the vacant slot defined to contain an engine 532 in specific class Model A 528 is filled using object V6 Gasoline 540. When instantiated in this way, VIN 123 (536) is a complete model of a single version of specific class Model A 528.

Automated processes support a user in the creation of new standard assemblies from ones that are already complete. For example, the model for the V6 Gasoline 540 engine is created from the existing model for the V6 Gasoline 514 engine. The software that mechanizes this invention allows a user to select the model for V6 Gasoline 514 and then command the system to "derive" a new model for V6 Gasoline 540. The software does this by making a new, top level record for V6 Gasoline 540 with all of the same attributes as V6 Gasoline 514. This new, top level record for V6 Gasoline 540 includes copies of all of the relationships to all of the sub-assemblies of V6 Gasoline 540, as well as copies of all relationships for which V6 Gasoline 514 entity is the "source" of the relationship. Relationships that identify the vehicles for which V6 Gasoline 514 is a sub-assembly, or other relationships for which V6 Gasoline 514 is the destination of the relationship, are not copied.

The software can automatically decide which relationships to copy and which to skip when deriving a new reusable assembly in the model because the metadata for the model indicates the source entity and destination entity of each relationship. Once the new model for V6 Gasoline 540 has been created, a user can identify the changes that are needed to capture the differences between these two engines. It is often the case that a model variation like this may, in reality, correspond to a change in the models for a few of the sub-assemblies, in order to provide a new feature, improve performance, or correct a defect. A side benefit of the mechanized invention is that there is a single model for elements of the model that are in fact common to both engines. This results in lower costs to maintain the accuracy of these portions of the model as new aspects of their behaviors are discovered in the field.

A final aspect of the invention is its ability to allow the user to select several specific models and to request that a new, more general, assembly is created to reflect their common properties and relationships. For example, in the previous scenario the user may wish to make a new, more general, assembly that includes the common aspects of the V6 Gasoline 514 and V6 Gasoline 540 engines. This new assembly could be named by the user to assist in its re-use (e.g., "Turbo Charged V6"), and edited to assist other users in creating more specialized engines from this model.

Each component of a fault model (shown as 200 in FIG. 2) may be modeled using an object (e.g., an instance of a specific class). In certain embodiments, the object may exist as a reusable fault model component that may be incorporated into a vacant slot within a fault model when needed, and may be stored within a database for reusable fault model components to be reused an unlimited number of times.

Figure 6:
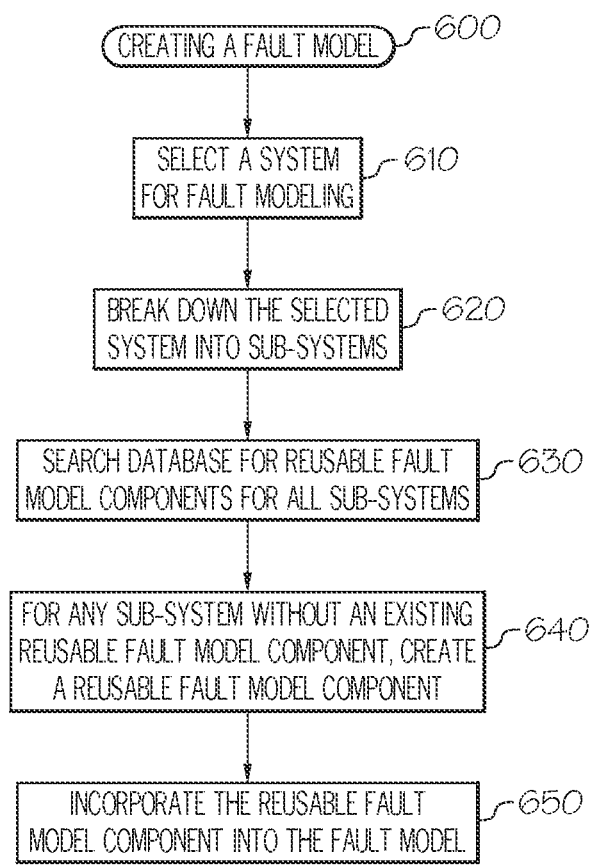
FIG. 6 is a high level flow chart that illustrates a method of creating and using a fault model, according to some embodiments.

FIG. 6 is a high level flow chart that illustrates an embodiment of a process 600 of creating a fault model. The various tasks performed in connection with a process described here may be performed by software, hardware, firmware, or any combination thereof. For illustrative purposes, the description of a process may refer to elements mentioned above in connection with FIGS. 1-5. In practice, portions of a described process may be performed by different elements of the described system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

For ease of description and clarity, this example assumes that the process 600 begins by selecting a system for fault modeling (step 610). In certain embodiments, the system may be selected by a person constructing the model, or chosen by a computer system according to predefined criteria. After selecting the system (step 610), the process 600 analyzes the selected system and breaks the system down into sub-systems (step 620). Sub-systems comprise any functional part of the system. In certain embodiments, sub-systems only include those functional parts of the system in which failure occurs in a complex manner, requiring evaluation so that adjustments and/or corrections may be made during system development.

Once the system has been defined in terms of sub-systems (step 620), the process 600 then searches a stored database of reusable fault model components for each of the sub-systems (step 630). Generally, a fault model of a system contains fault model components to represent each sub-system, each of which is created during construction of the fault model of the entire system. In certain embodiments, one or more of these fault model components may already exist in a stored database of reusable fault model components. Here, the stored database is searched to locate reusable fault model components applicable to the fault model being created for the system.

Next, the process 600 identifies the sub-systems that do not have a corresponding reusable fault model component stored in the database, and creates a reusable fault model component for these sub-systems (step 640). After the reusable fault model component is created (step 640), the process 600 then incorporates the reusable fault model component into the fault model (step 620). In certain embodiments, the reusable fault model component is an object that has been instantiated from a specific class. The object may be incorporated into the fault model as an assembly, sub-assembly, or other component at any level within the fault model hierarchy.

Figure 7:
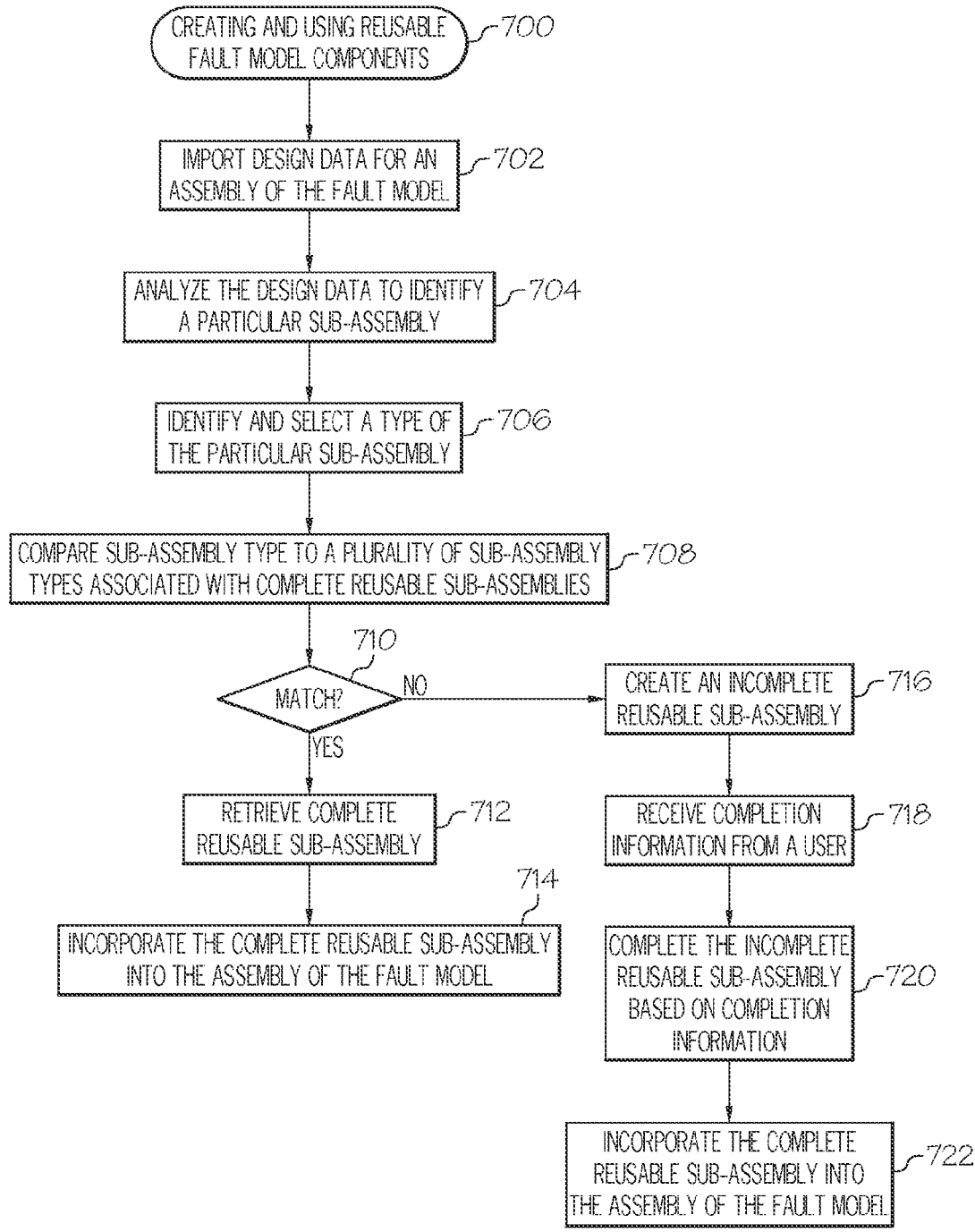
FIG. 7 is another flow chart that illustrates a method of creating and using a fault model, according to some embodiments.

FIG. 7 is a flow chart that illustrates an embodiment of a process 700 of creating and using a fault model. This example assumes that the process 700 begins when a fault modeling system imports design data for an assembly, wherein a fault model of the assembly is to be generated (step 702). In certain embodiments, the design data may include schematics or technical documentation describing the assembly and/or specific parts of the assembly.

The process 700 then analyzes the design data to identify and select a particular sub-assembly (step 704) using pre-defined criteria. In certain embodiments, a sub-assembly meets pre-defined criteria if it has at least one electrical connection. For example, in the case of the vehicle described in FIGS. 3-5, the design data may include an electrical schematic, and a particular sub-assembly may be identified and/or chosen for fault modeling because it includes at least one electrical connection. In some embodiments, a sub-assembly meets pre-defined criteria if it has a pneumatic connection. In other embodiments, the pre-defined criteria is met if a sub-assembly includes at least one hydraulic connection. The selection of pre-defined criteria is a design choice, and may include any specified characteristic or attribute of the sub-assembly. In certain embodiments, the specified characteristic or attribute of interest is chosen due to its propensity for unexplained failure.

In the simplest case, each component in a schematic will identify a component class which is strongly correlated to one, or a small number, of reusable assemblies. This is accomplished through the specification of a component code or other nomenclature that limits the set of reusable assemblies that can be used in that location. In other cases, the association between a design element, like a component slot on a schematic and the set of reusable assemblies that can be placed in that slot, may be more difficult to determine. For example, in one scenario, the pre-defined criteria designed to assess the number and types of interfaces between the component and the other components with which it interacts. The results of this assessment provide the user with a small number of reusable assemblies that can be assigned to each location/slot in a higher level assembly.

Next, the process 700 identifies a type associated with the selected sub-assembly (step 706). The type of the selected sub-assembly identifies more specifically the part in question. For example, once the sub-assembly is identified as having at least one electrical connection, it is then further identified by type. In certain embodiments, the sub-assembly type is the name of a certain part, such as a lane departure radar. In other embodiments, the sub-assembly type is the name of a category of parts, such as a vehicle engine, which further includes sub-sub-assemblies, such as those referenced in FIG. 3. In certain embodiments, when creating a fault model for an automobile or other vehicle, each sub-assembly of the vehicle may have a type defined by a part classification, such as a Universal Parts Classification/Functional Name Analysis (UPC/FNA) designation. In other embodiments, each sub-assembly may have a type defined by a specific product structure, such as a Vehicle Partitioning and Product Structure (VPPS) designation. In still other embodiments, another methodology for assigning a type to each sub-assembly may be deciphered by the process 700.

The process 700 then compares the sub-assembly type to a plurality of sub-assembly types associated with a plurality of complete reusable sub-assemblies (step 708). A sub-assembly is "complete" when it has been instantiated as an object, including all specific attributes required for such. For example, any of the instantiated specific classes, also called objects, shown in FIG. 5 may be referred to as complete (e.g., light chassis 538, V6 Gasoline 540, Steel 15" 542, and VIN 123 (536)). A sub-assembly is reusable when it has been stored, maintained, and is capable of being used again, in an unlimited number of fault models and an unlimited number of times. The complete reusable sub-assemblies are stored in an internal or external memory location of the system, and in certain embodiments, the complete reusable sub-assemblies are maintained in a database dedicated for this purpose.

The comparison of the selected sub-assembly type to a database of types associated with a group of complete reusable sub-assemblies is used to determine if a complete version of the selected sub-assembly has already been created and already resides in system memory. If this is the case, then there is no need to re-create the required complete version of the selected sub-assembly. When the identified sub-assembly type matches one of the plurality of sub-assembly types associated with a plurality of complete reusable sub-assemblies (the "Yes" branch of 710), the process 700 retrieves the complete reusable sub-assembly associated with the match (step 712) from its location in memory, and incorporates it into the assembly of the fault model (step 714).

When the identified sub-assembly type does not match one of the plurality of sub-assembly types associated with a plurality of complete reusable sub-assemblies (the "No" branch of 710), it is determined that a complete version of the selected sub-assembly has not been created and does not reside in system memory. In this case, the process 700 then creates an incomplete reusable sub-assembly (step 716). The incomplete version of a reusable sub-assembly is created using the limited information available, and acts as a placeholder to be completed once comprehensive information is obtained. In certain embodiments, completion information is acquired by retrieving stored information from a location in memory, and in other embodiments, completion information is received as user input.

After creating the incomplete reusable sub-assembly (step 716), the process 700 then receives completion information from a user (step 718). In certain embodiments, receiving completion information from a user occurs in response to a request from the process 700. For example, when the comparison does not result in a match and the process 700 has determined that the required sub-assembly does not exist in system memory as a complete reusable sub-assembly, the process 700 prompts a user to provide input detailing the required completion information for the incomplete version of the reusable sub-assembly. In certain embodiments, an "expert" user is necessary to provide the required completion information, and is prompted by the process 700 to do so. For example, the process 700 may request "expert" user input in response to a set of questions, and this set of questions is designed to provide adequate detail so that the sub-assembly in question may be incorporated into any assembly without incompatibility or incompleteness issues. In some embodiments, the same set of questions is used for each new sub-assembly, and the set of questions is created to accommodate all potential sub-assemblies. Examples of completion information include, without limitation: specific failure rates for failure modes, specific co-occurrence rates between failure modes and symptoms, specific parameter values for analytic algorithms, specific trip points for diagnostic monitors, specific degradation profiles for predictive monitors, and the like.

Next, the process 700 completes the incomplete reusable sub-assembly based on the received completion information (step 720). In certain embodiments, the incomplete reusable sub-assembly is a specific class, and the completion information is used to instantiate the object using specific details. Using the Model A example illustrated in FIG. 5, chassis 530 could be designated as an incomplete reusable sub-assembly, and user input could be obtained to identify an appropriate light chassis 508 for the fault model. Once the appropriate light chassis 508 is chosen, it is then instantiated as object light chassis 538, which is suitable for incorporation into the fault model. In this example, object light chassis 538 is a complete reusable component, which is capable of incorporation into a fault model and/or storage for use in any number of future fault models. In other embodiments, the incomplete reusable sub-assembly is an incomplete specific class, containing defined vacancies for only a portion of the required components. Again using the Model A example illustrated in FIG. 5, specific class Model A 528 could be designated as an incomplete reusable sub-assembly, and user input could be obtained to identify additional slots or defined vacancies that are necessary for Model A 528.

Generally, incomplete reusable assemblies operate as classes, and are identified separately in a fault model. Incomplete reusable assemblies include partial diagnostic information, along with automated rules regarding the process 700 for which the diagnostic information is utilized when a new assembly is created based on an incomplete assembly. To complete the assembly created from a partial assembly, a user adds additional diagnostic information. Incomplete assemblies are not included in final output of a fault model; they are used only to provide a baseline set of diagnostic information which is used to create a complete assembly. A diagnostic model may be created for a complete assembly (and any associated sub-assemblies) only, or the complete assembly may be linked as a sub-assembly to a higher level assembly. Each time a given assembly is associated with a different higher level assembly, it is essentially reused. Each time a given assembly is reused, usage-specific information is identified to give information regarding how the assembly is to be used within a fault model.

Following completion of the incomplete reusable sub-assembly, the process 700 incorporates the complete reusable sub-assembly into the assembly of the fault model (step 722). Further, in some embodiments, the newly-finalized complete reusable sub-assembly is stored in a location in system memory (e.g., a database of complete reusable sub-assemblies) for future use.

A diagnostic model, or fault model, may be created for any given assembly, provided specified fields of information associated with the assembly have been completed. Once values for these specified fields of information have been set, the fault model may be generated for the assembly, to include any sub-assemblies associated with the assembly. A distinct fault model may be generated for a lower level assembly, and another fault model may be generated for each fault model assembly that the lower level assembly is used in. The lower level fault model would typically have more particular diagnostic instructions for the individual lower level component alone, while the higher level fault model would have more information about how the assembly interacts with other subsystems in the fault model.

After the complete reusable sub-assembly is incorporated into the fault model (step 722), the fault model is executed. When a reusable fault model component is created, it is stored in a database system that allows it to be reused across multiple fault model level assemblies. Following execution of the fault model, any reusable fault model components remain stored in the database system. The reusable fault model component may be reused an unlimited number of times, until it is marked as obsolete because it is no longer being used by any fault model level assemblies.

Model Based Prognostics Using Reusable Fault Model Components

Figure 8:
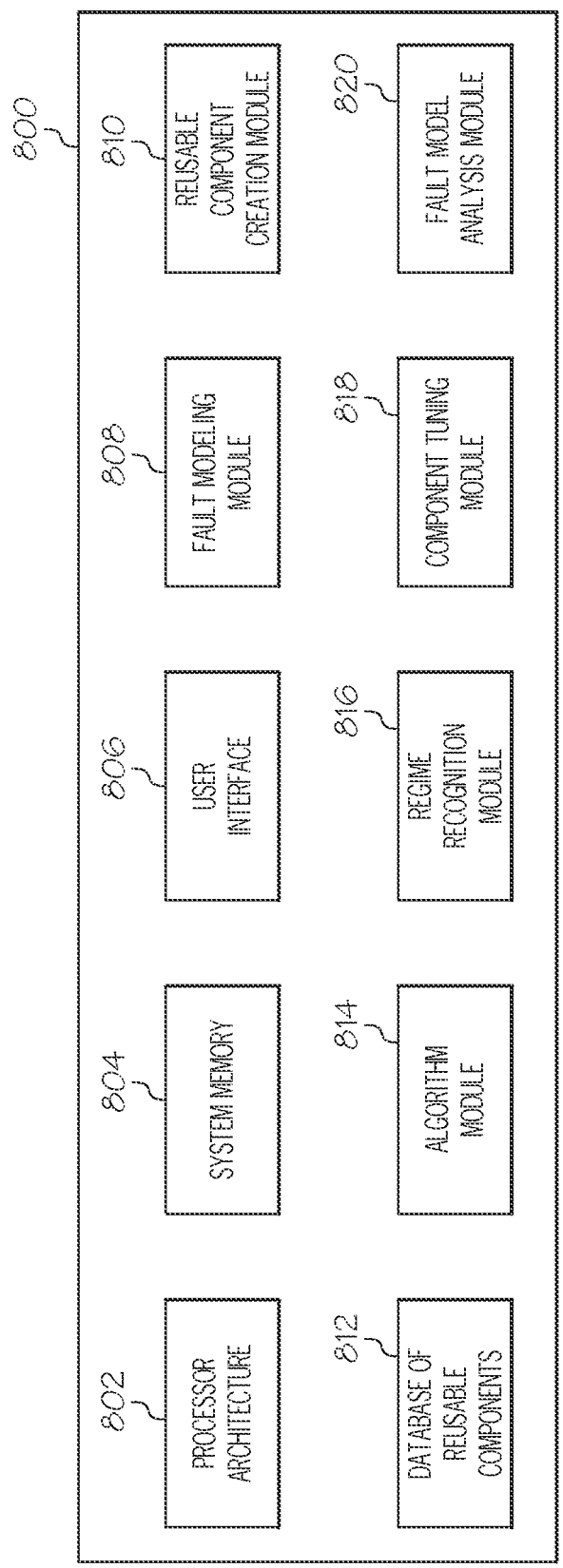
FIG. 8 is a schematic block diagram representation of a fault modeling prognostics system, according to some embodiments.

FIG. 8 is a schematic block diagram representation of a fault modeling prognostics system 800, according to some embodiments. The illustrated embodiment of the fault modeling prognostics system 800 generally includes, without limitation: a processor architecture 802; system memory 804; a user interface 806; a fault modeling module 808; a reusable component creation module 810; a database of reusable components 812; an algorithm module 814; a regime recognition module 816; a component tuning module 818; and a fault model analysis module 820. These elements and features of the fault modeling prognostics system 800 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 8. Moreover, it should be appreciated that embodiments of the fault modeling prognostics system 800 will include other elements, modules, and features that cooperate to support the desired functionality. For simplicity, FIG. 8 only depicts certain elements that relate to the prognostic techniques described in more detail below.

The processor architecture 802, the system memory 804, the user interface 806, the fault modeling module 808, the reusable component creation module 810, and the database of reusable components 812 are similar in configuration and function to their counterpart items described above in the context of the fault modeling system shown in FIG. 1. Accordingly, common features and operations of these elements of the fault modeling prognostics system 800 will not be redundantly described here.

The algorithm module 814 is configured to determine appropriate algorithms for a particular reusable component, and to associate the appropriate algorithms with the reusable component for use in defining behavior of the reusable component and predicting degradation and/or failure of the actual hardware (i.e., component) that is associated with the software-modeled, reusable fault model component. Exemplary embodiments of algorithms may include, without limitation: a transfer function, a signal-to-noise ratio, estimated non-linearities (e.g., stiction, backlash, hysteresis), and/or error counters. It should be appreciated that other algorithms applicable to modeling a component, including those specific to fault-modeling, may also be used. In certain embodiments, the algorithm module 814 accesses stored data recordings, specific to a reusable component, which provide a snapshot of performance data for the reusable component. Component parameter data is obtained from the data recordings. In some embodiments, however, the algorithm module 814 accesses streaming data (in other words, current, real-time data) to obtain the component parameter data. Component parameter data extracted from the data recordings, or obtained from streaming data, is used during execution of the applicable algorithm to generate performance indices for the reusable component. Performance indices may be used in further analysis by the fault modeling prognostics system 800.

The regime recognition module 816 is suitably configured to identify a current regime for the hardware associated with a reusable fault model component, at any given time. A regime may be defined as an indication of equipment mode and state: (i) that affects the rate at which the equipment usage is accumulated, (ii) in which fault indications are viewed as legitimate, (iii) in which condition indicators are being reliable, and/or (iv) in which data needs to be collected.

The component tuning module 818 is configured to adjust input to prognostics algorithms associated with a reusable component in order to adjust component behavior parameters and/or the output of the reusable component during execution of the fault model. Parameters may include, without limitation: damping ratio, natural frequency, time constant, leading coefficient, trip points, and parameter degradation coefficients. Other parameters which may be adjusted based on tuning processes, may include performance indices, including measured variables, corrected variables, and/or synthesized variables.

In certain embodiments, the component tuning module 818 conducts a first (i.e., initial) tuning when a reusable component is incorporated into the fault model. Because the reusable component is new, the component tuning module 818 does not have access to historical data for the reusable component. In this case, the component tuning module 818 uses test data or sample data to carry out the initial tuning. Here, the test data or sample data includes data recordings, which may be stored in system memory.

The component tuning module 818 also performs continuous tuning for the reusable component during the life of the reusable component in the fault model. Each time the continuous tuning processes are performed, the component tuning module 818 uses current, real-time input data parameters. Continuous tuning may occur at timed intervals, or may be event-driven. Continuous tuning is performed in order to accurately predict component degradation which results in a fault in the complex system represented by the fault model.

The fault model analysis module 820 is configured to evaluate output of one or more algorithms associated with a reusable component to predict faults due to degradation of the reusable component or the system itself. In some embodiments, the fault model analysis module 820 may use reusable component parameter trends to make these predictions. Based on the evaluation of the fault model analysis module 820, the fault modeling prognostics system 800 may advise maintenance for the component hardware associated with the reusable component or for the complex system associated with the fault model.

In practice, the fault modeling module 808, the reusable component creation module 810, the algorithm module 814, the regime recognition module 816, the component tuning module 818, and/or the fault model analysis module 820 may be implemented with (or cooperate with) the processor architecture 802 to perform at least some of the functions and operations described in more detail herein. In this regard, the fault modeling module 808, the reusable component creation module 810, the algorithm module 814, the regime recognition module 816, the component tuning module 818, and/or the fault model analysis module 820 may be realized as suitably written processing logic, application program code, or the like.

Figure 9:
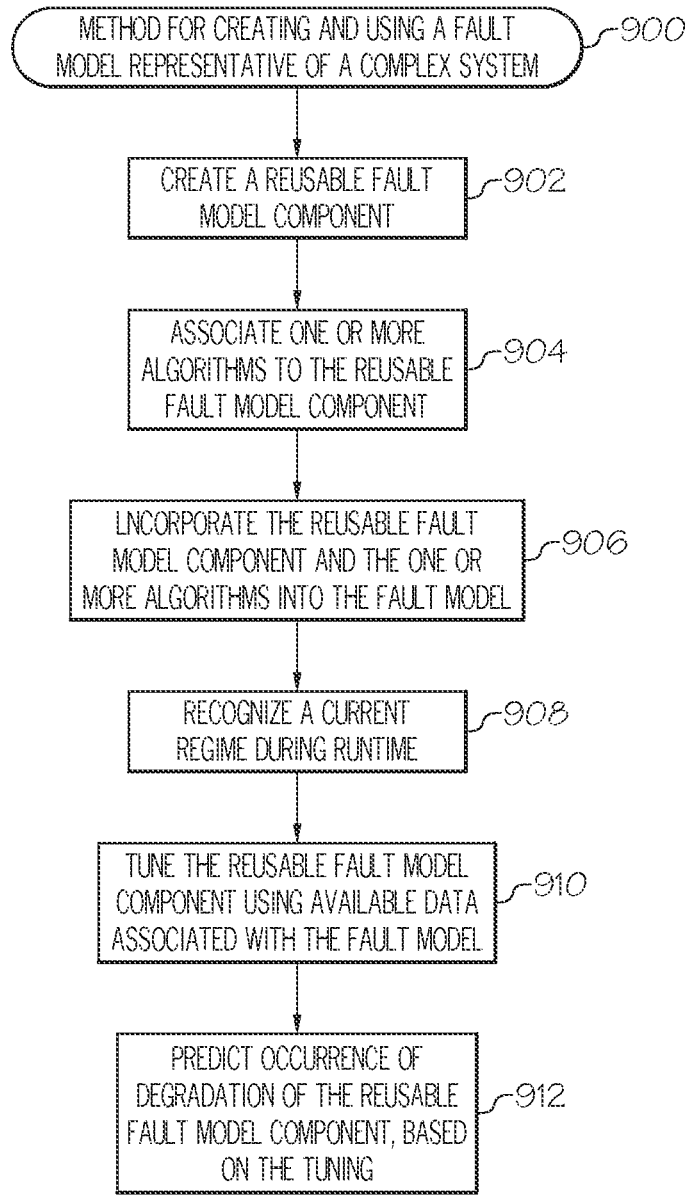
FIG. 9 is a high level flow chart that illustrates a method for creating and using a fault model representative of a complex system, according to some embodiments.

FIG. 9 is a high level flow chart that illustrates an embodiment of a process 900 for creating and using a fault model representative of a complex system. The various tasks performed in connection with process 900 may be performed by software, hardware, firmware, or any combination thereof. For illustrative purposes, the following description of process 900 may refer to elements mentioned above in connection with FIG. 8. In practice, portions of process 900 may be performed by different elements of the described system. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein. Moreover, one or more of the tasks shown in FIG. 9 could be omitted from an embodiment of the process 900 as long as the intended overall functionality remains intact.

First, the process 900 creates a reusable fault model component (step 902). Creation of reusable fault model components is described above, with regard to FIGS. 1-7, and will not be redundantly described here. Next, the process 900 associates one or more algorithms to the reusable fault model component (step 904). Here, the process 900 associates algorithms that define behavior of the hardware associated with a reusable fault modeling component and/or algorithms that support regime recognition. Exemplary embodiments of algorithms that define behavior of the hardware associated with the reusable fault modeling component may include, without limitation: a transfer function, a signal-to-noise ratio, estimated non-linearities (e.g., stiction, backlash, hysteresis), and/or error counters. It should be appreciated that other algorithms applicable to modeling a component, including those specific to fault-modeling, may also be used.

The process 900 then incorporates the reusable fault model component and the one or more algorithms into the fault model (step 906). One suitable methodology for incorporating the reusable fault model component and the one or more algorithms into the fault model is described below with reference to FIG. 10. Incorporating the reusable fault model component (and associated algorithms) generally includes identifying the parameters required by the algorithms associated with the reusable component, and determining values for those parameters through measurements and/or calculations.

After incorporating the reusable fault model component and associated algorithms into the fault model (step 906), the reusable fault model component is used during runtime, or in other words, execution of the fault model. Generally, in embodiments where regime recognition is used, regime recognition is occurring continuously during runtime. In some embodiments, however, a regime may be recognized offline (i.e., not during runtime), in order to identify a regime represented by recorded data from a reusable fault modeling component.

In certain embodiments, at runtime, the process 900 recognizes a current regime (step 908). It should be appreciated that regime recognition is a feature of certain embodiments of the process 900, but that regime recognition is not required for the steps 902-906 and 910-912 to be performed by the process 900. Here, the process 900 identifies a regime, which may be defined as: an indication of equipment mode and state: (i) that affects the rate at which the equipment usage is accumulated, (ii) in which fault indications are viewed as legitimate, (iii) in which condition indicators are being reliable, and/or (iv) in which data needs to be collected.

Each piece of equipment or hardware that is associated with a reusable fault model component has a different set of regimes that provide additional data used in fault modeling. For example, a recognized "aircraft landing" regime may be useful to a radio altimeter. However, this particular regime may not be useful to a flight lateral navigation system or to an auxiliary power unit (APU) performance, which are more interested in a "ground start" regime and an "engine start" regime. One exemplary embodiment of a regime is an "engine start" event. The engine start regime affects the operation of various hardware components, thereby affecting associated reusable fault modeling components in a fault modeling environment. Each hardware component and/or system on a platform (e.g., an aircraft or vehicle) may have trouble communicating with other hardware components or systems during an engine start regime. One example of hardware affected by the engine start regime is a battery working with the engine. In this example, the battery is hardware associated with a reusable fault modeling component, and the engine is an associated system (e.g., a plurality of reusable fault modeling components working cooperatively). A battery is affected by temperature, and a cold morning start or a very hot weather start is harder on a battery than an engine start occurring in an environment that includes a normal temperature range.

Here, the process 900 recognizes a current regime (step 908) to put data collection during the identified regime into an appropriate context. Regimes, including the engine start regime, include particular characteristics which may affect behavior of a reusable fault modeling component of interest. Certain regimes may render particular data, collected from a particular component, invalid. Using the current example of the battery and the engine, data is collected from the perspective of the battery component during various regimes, including the engine start regime. During engine start, communication between hardware components may be inhibited, resulting in communication faults and invalid data. Regime recognition (step 908) may be used by the process 900 when necessary to provide context for the collected data.

The process 900 then tunes the reusable fault model component using available data associated with the fault model (step 910). One suitable methodology for tuning the reusable fault model component using available data associated with the fault model is described below with reference to FIG. 12. Tuning includes predicting, detecting, and diagnosing faults of one or more reusable fault modeling components using estimated parameter data provided as input to a fault model that includes one or more algorithms associated with a particular reusable fault modeling component. Here, the process 900 adjusts output of the prognostic algorithms by using parameter data retrieved from component performance snapshots and other available data. Generally, the available data includes detail for instances of the hardware component or system modelled using the reusable fault modeling component. For example, a fault model for a particular aircraft may include a reusable fault modeling component for Aircraft Component 1. In this example, the available data includes data specific to the aircraft and/or Aircraft Component 1.

Next, the process 900 predicts occurrence of degradation of the reusable fault model component, based on the tuning (step 912). One suitable methodology for predicting occurrence of degradation of the reusable fault model component is described below with reference to FIG. 11. Here, the process 900 uses trends and/or comparisons of output data generated during tuning to predict, detect, and diagnose faults. In some cases, the occurrence of degradation may be predicted to occur in a certain distant time-frame. However, the process 900 may also predict degradation occurring in the near-term, or the process 900 may predict that degradation is currently likely.

Figure 10:
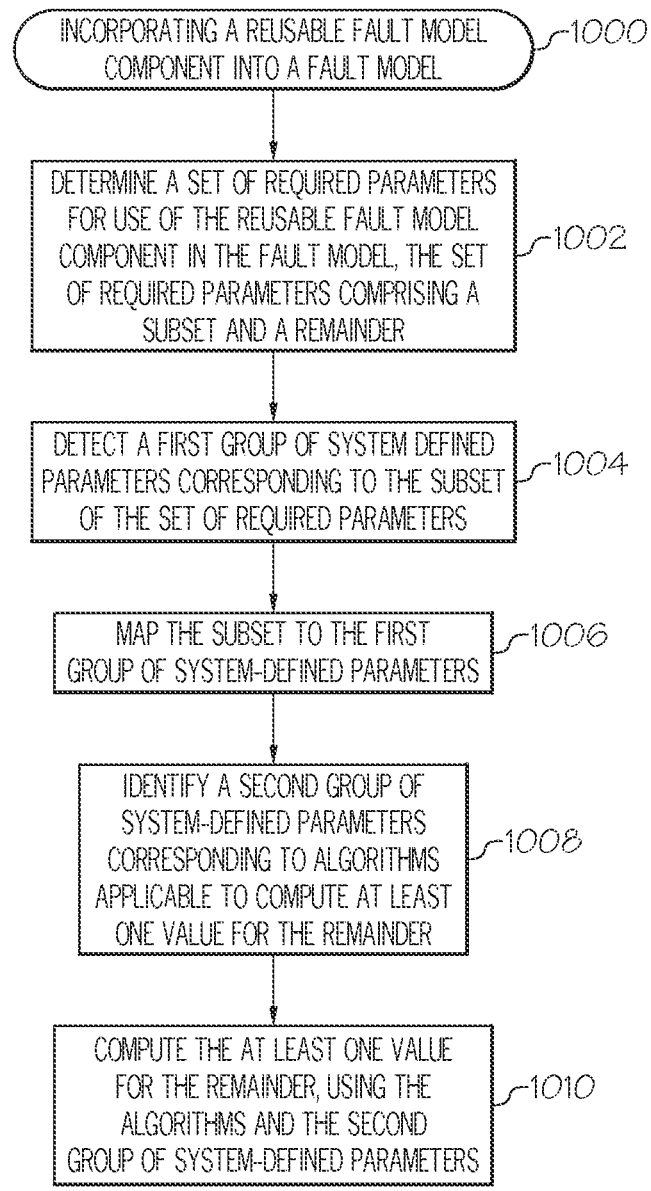
FIG. 10 is a flow chart that illustrates an embodiment of a process for incorporating a reusable fault model component into a fault model.

FIG. 10 is a flow chart that illustrates an embodiment of a process 1000 for incorporating a reusable fault model component into a fault model. It should be appreciated that the process 1000 described in FIG. 10 represents one embodiment of step 906 described above in the discussion of FIG. 9, including additional detail. First, the process 1000 determines a set of required parameters for use of the reusable fault model component in the fault model, the set of required parameters comprising a subset and a remainder (step 1002). In context of process 1000, the reusable fault modeling component may be any lower-level single assembly, or any assembly aggregation of reusable fault modeling components integrated into a higher-level assembly or platform.

Next, the process 1000 detects a first group of system-defined parameters corresponding to the subset of the set of required parameters (step 1004). Here, the parameters are measured by the system and retrieved by the process 1000 for use. No calculation or manipulation of the system-defined parameters is required. After detecting the system-defined parameters (step 1004), the process 1000 maps the subset to the first group of system-defined parameters (step 1006), ensuring accessibility of the parameters required to execute algorithms applicable to the reusable component.

The process 1000 then identifies a second group of system-defined parameters corresponding to algorithms applicable to compute at least one value for the remainder (step 1008). Here, the process 1000 is unable to locate a particular parameter value that is explicitly defined by the system, so the process 1000 recognizes other system-defined parameters that can be used to calculate the needed parameter value. Next, the process 1000 computes the at least one value for the remainder, using the algorithms and the second group of system-defined parameters (step 1010).

Figure 11:
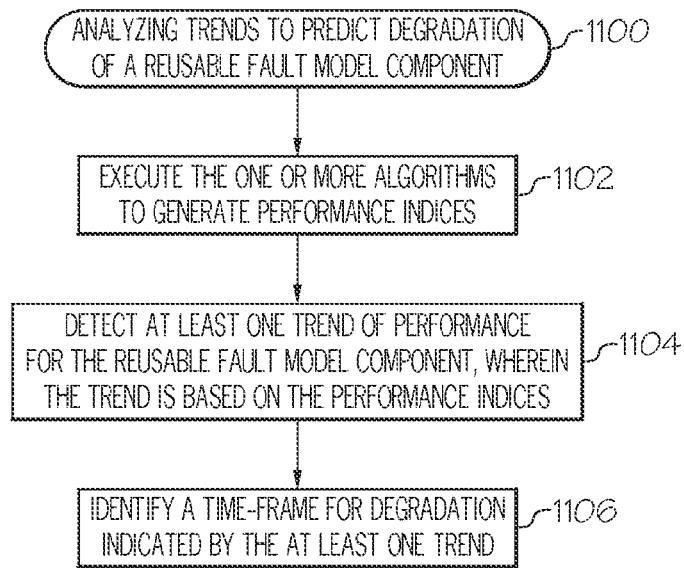
FIG. 11 is a flow chart that illustrates an embodiment of a process for analyzing trends to predict degradation of a reusable fault model component.

FIG. 11 is a flow chart that illustrates an embodiment of a process 1100 for analyzing trends to predict degradation of a reusable fault model component. It should be appreciated that the process 1100 described in FIG. 11 represents one embodiment of step 910 described above in the discussion of FIG. 9, including additional detail. First, the process 1100 executes the one or more algorithms to generate performance indices (step 1102). A performance index is a parametric measure of the health of a hardware component associated with a reusable fault modeling component, or a system or platform implemented using an aggregation of reusable fault modeling components. Performance indices may include measured variables, corrected variables, and synthesized variables. A measured variable is a parameter associated with a reusable fault modeling component that has been measured directly from the system associated with the fault model. A corrected variable combines several measurements at the system level to correct one component parameter for ambient conditions. For example, a battery voltage may need to be corrected based on a current, ambient temperature. A synthesized variable is an estimated or calculated parameter that is unavailable for measurement but may be calculated based on other measured data.

Next, the process 1100 detects at least one trend of performance for the reusable fault model component, wherein the trend is based on the performance indices (step 1104). Based on the trend, the process 1100 may determine an alerting level, based on the trend. Alerting levels associated with the fault modeling prognostics may include, without limitation: no alert, inspection recommended, maintenance advised, maintenance required, or the like. In other embodiments, alerting levels may include color-coding that indicates alerting levels ranging from the most serious to the most benign.

After determining a current alerting level, the process 1100 then identifies a time-frame for degradation indicated by the at least one trend (step 1106). Here, the process 1100 determines a time-frame for degradation by identifying a projected period of time before failure of hardware or device associated with the reusable fault modeling component. In certain embodiments, the process 1100 calculates a derivative of the identified trend, and forecasts the life of the reusable fault modeling component based on the results of the calculated derivative.

Figure 12:
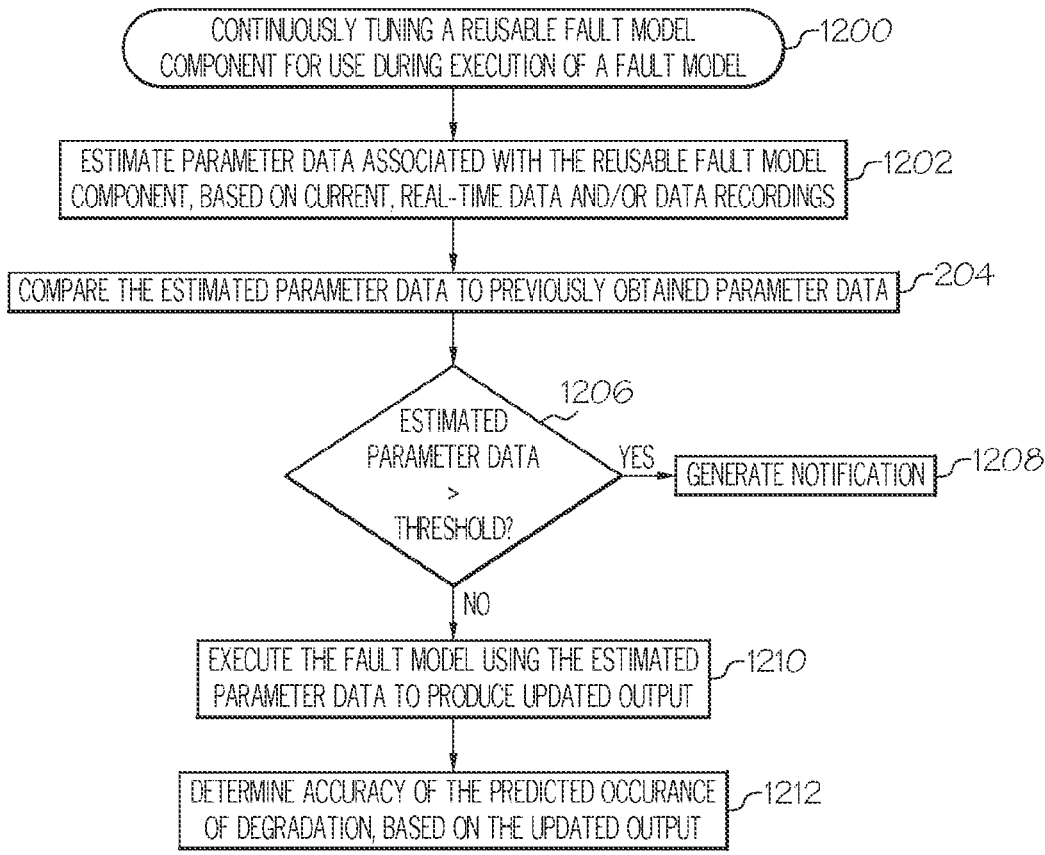
FIG. 12 is a flow chart that illustrates an embodiment of a process for continuously tuning a reusable fault model component for use during execution of a fault model.

FIG. 12 is a flow chart that illustrates an embodiment of a process 1200 for continuously tuning a reusable fault model component for use during execution of a fault model. It should be appreciated that the process 1200 described in FIG. 12 represents one embodiment of step 908 described above in the discussion of FIG. 9, including additional detail. First, the process 1200 estimates parameter data associated with the reusable fault model component, based on current, real-time data and/or data recordings (step 1202). The estimated parameter data includes coefficients and trip points applicable to algorithms associated with each reusable fault modeling component. To obtain "tuned" trip points, the process 1200 executes the fault model for a predefined period of time using pre-existing data (e.g., data recordings). The process 1200 may determine, for example, the alert levels described above with regard to FIG. 11. One example of a set of alert levels may be set to green (more than a week to failure), yellow (less than one week to failure, but greater than three days to failure), orange (less than three days to failure), and red (the hardware or device associated with the reusable fault model component has failed). The process 1200 then tunes the fault model, based on historical data and calculates performance indices. The process 1200 trends the performance indices against historical data, and identifies degradation into failure. The process 1200 then determines a location on the trendline for a trip point which identifies a location on the trendline at which the component goes to a yellow alert level. To obtain "tuned" coefficients, the process 1200 determines a necessary coefficient to optimize a particular metric or parameter specified by the reusable fault modeling component.

The process 1200 then compares the estimated parameter data to previously obtained parameter data (step 1204), and determines whether the estimated parameter data is greater than a threshold (step 1206). When the parameters are greater than the predetermined threshold (the "Yes" branch of 1206), the process 1200 determines that the estimated parameters are sufficiently different from previous estimated parameter data to indicate potential hardware error or failure issues, and the process 1200 generates a notification to this effect.

However, when the parameters are not greater than the predetermined threshold (the "No" branch of 1206), the process 1200 continues by executing the fault model using the estimated parameter data to produce updated output (step 1210). The updated output is produced by tuning the fault model, and is further used as input to continue tuning the fault model. During initial tuning, the process 1200 determines an initial value of coefficients and trip points using recorded data for a reusable fault modeling component. During continuous tuning, the process 1200 continuously updates the coefficients (to optimize component parameters) and trip points (to identify alert levels for predicting degradation of a component).

The process 1200 then determines accuracy of the predicted occurrence of degradation, based on the updated output (step 1212). Here, the process 1200 provides estimated parameter data as input to the fault model and executes the fault model to generate output. During execution of the fault model, the process 1200 updates algorithms associated with the reusable fault model component, based on the input, and then compares the output with a set of recorded fault data to correlate the parameter data to a set of previous parameter data, and to determine the accuracy of the predicted degradation based on the correlation.

Figure 13:
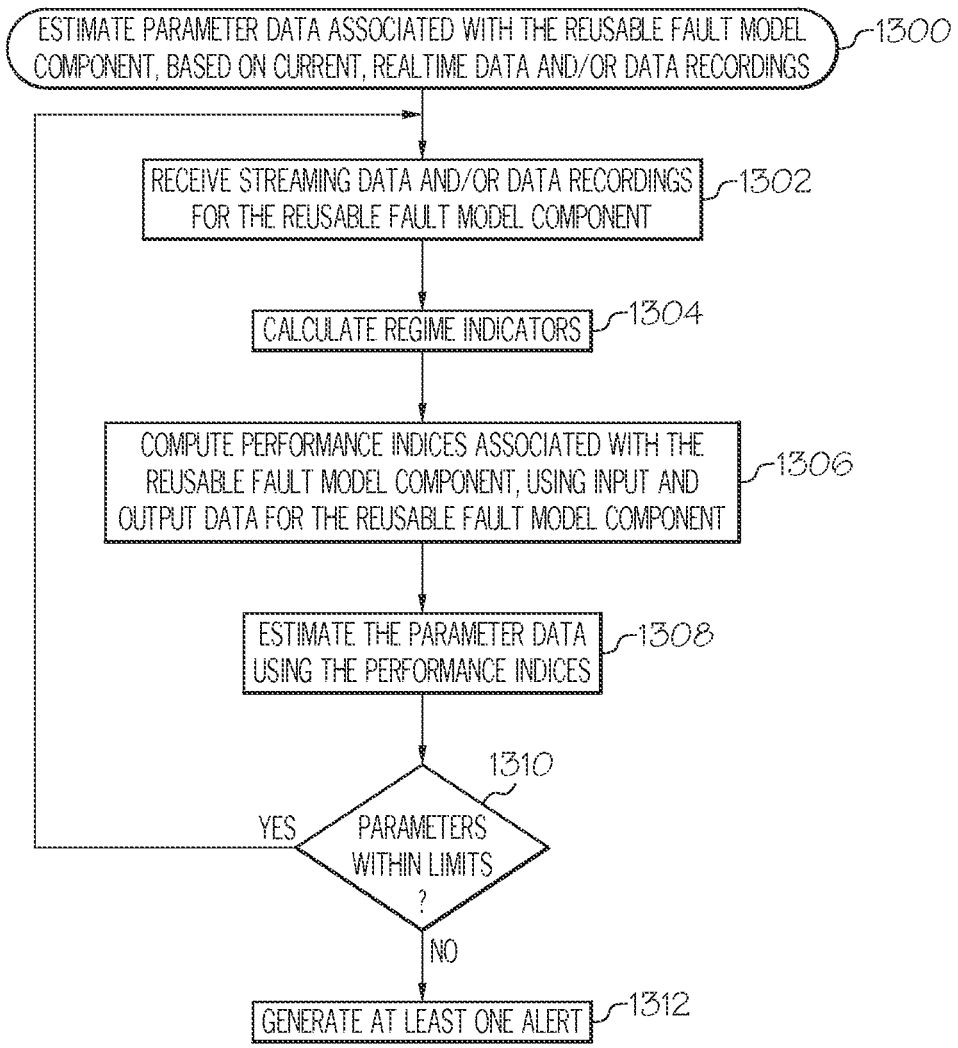
FIG. 13 is a flow chart that illustrates an embodiment of a process for estimating parameter data associated with a reusable fault model component, based on current, real-time data and/or data recordings.

FIG. 13 is a flow chart that illustrates an embodiment of a process 1300 for estimating parameter data associated with a reusable fault model component, based on current, real-time data and/or data recordings. First, the process 1300 receives streaming data and/or data recordings for the reusable fault model component (step 1302). Streaming data may be obtained during operation of the platform, system, or component associated with the fault model and, in particular, a reusable fault modeling component. Next, the process 1300 calculates regime indicators (step 1304) to determine (i) whether performance indicators should be calculated, based on streaming data; (ii) whether streaming data should be recorded for later analysis; and (iii) whether, when evaluating recorded data, performance indices should be calculated for a particular segment of the recorded data. The process 1300 then computes performance indices associated with the reusable fault modeling component, using input and output data for the reusable fault modeling component (step 1306). The process 1300 then estimates parameter data using the performance indices (step 1308), and determines whether the estimated parameter data is within acceptable limits (1310). When the estimated parameters are not within acceptable limits (the "No" branch of 1310), then the process 1300 generates at least one alert.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for creating and using a fault model representative of a system, the fault model comprising one or more fault model components, the method comprising:
   creating a reusable fault model component;
   associating one or more algorithms to the reusable fault model component, the one or more algorithms describing behavior of the reusable fault model component, wherein the one or more algorithms comprises at least one of a transfer function, a signal-to-noise ratio, estimated non-linearities, and an error counter;
   incorporating the reusable fault model component and the one or more algorithms into the fault model; and
   during runtime of the fault model,
      recognizing a current regime associated with the reusable fault model component, wherein the current regime provides a context for operation of the reusable fault model component, and wherein the current regime comprises an indication of equipment mode and state affecting a rate at which equipment usage is accumulated, at which fault indications are viewed as legitimate, at which condition indicators are reliable, and at which data needs to be collected;
      collecting the data associated with the reusable fault model component, based on the context provided by the current regime;
      tuning the reusable fault model component, using available data associated with the fault model; and
      predicting occurrence of degradation of the system, based on the collected data and the tuning.

2. The method of claim 1, further comprising:
   executing the one or more algorithms to generate performance indices;
   detecting at least one trend of performance for the reusable fault model component, wherein the trend is based on the performance indices; and
   identifying a time-frame for degradation indicated by the at least one trend;
   wherein predicting the occurrence of degradation is based on the time-frame.

3. The method of claim 2, further comprising:
   presenting an alert advising maintenance for the system, based on predicting the occurrence of degradation.

4. The method of claim 1, wherein tuning the reusable fault model component further comprises:
   initially tuning when the reusable fault model component is integrated into the fault model, the initial tuning using sample data; and
   continuously tuning during use of the fault model, the continuously tuning using at least current, real-time data.

5. The method of claim 4, wherein initially tuning the reusable fault model component further comprises:
   estimating parameter data associated with the reusable fault model component, based on the sample data;
   executing the fault model using the estimated parameter data, to produce updated output; and determining accuracy of the predicted occurrence of degradation, based on the updated output.

6. The method of claim 5, wherein continuously tuning the reusable fault model component during execution of the fault model further comprises:
estimating parameter data associated with the reusable fault model component, based on the current, real-time data;
executing the fault model using the estimated parameter data, to produce updated output; and
determining the accuracy of the predicted occurrence of degradation, based on the updated output.

7. The method of claim 6, wherein continuously tuning the reusable fault model component during execution of the fault model further comprises:
receiving data recordings for the reusable fault model component;
computing performance indices associated with the reusable fault model component, using input and output data for the reusable fault model component;
estimating the parameter data associated with the reusable fault model component, using the performance indices.

8. The method of claim 6, wherein determining the accuracy of the predicted occurrence of degradation further comprises:
providing the parameter data as input to the fault model;
executing the fault model to generate output; and
updating the one or more algorithms during execution of the fault model, based on the input;
comparing the output with a set of recorded fault data to correlate the parameter data to a set of previous parameter data;
determining accuracy of the predicted occurrence of the degradation, based on the output and the correlated parameter data.

9. The method of claim 1, wherein incorporating the reusable fault model component and the one or more algorithms into the fault model further comprises:
determining a set of required parameters for use of the reusable fault model component in the fault model;
detecting system-defined parameters corresponding to the set of required parameters; and
mapping the set of required parameters to the system-defined parameters.

10. The method of claim 1, wherein incorporating the reusable fault model component and the one or more algorithms into the fault model further comprises:
determining a set of required parameters for use of the reusable fault model component in the fault model, the set of required parameters comprising a subset and a remainder;
detecting a first group of system-defined parameters corresponding to the subset of the set of required parameters;
mapping the subset to the first group of system-defined parameters;
identifying a second group of system-defined parameters corresponding to algorithms applicable to compute at least one value for the remainder; and
computing the at least one value for the remainder, using the algorithms and the second group of system-defined parameters.

11. A method for using reusable sub-assemblies in a fault model associated with a system, the method comprising:
associating one or more algorithms to a reusable sub-assembly comprising a reusable fault model component, the one or more algorithms describing behavior of the reusable fault model component, wherein the one or more algorithms comprises at least one of a transfer function, a signal-to-noise ratio, estimated non-linearities, and an error counter;
incorporating the reusable sub-assembly into the fault model, the reusable sub-assembly representing a component of the system; and
during runtime of the fault model,
recognizing a current regime associated with the reusable fault model component, wherein the current regime provides a context for operation of the reusable fault model component, and wherein the current regime comprises an indication of equipment mode and state affecting a rate at which equipment usage is accumulated, at which fault indications are viewed as legitimate, at which condition indicators are reliable, and at which data needs to be collected;
collecting the data associated with the reusable fault model component, based on the context provided by the current regime;
tuning the reusable fault model component, using available data associated with the fault model; and
predicting potential faults of the system using the reusable sub-assembly, based on the collected data and the tuning, wherein the potential faults indicate degradation of the system.

12. The method of claim 11, further comprising:
estimating parameter data associated with the reusable sub-assembly;
executing the fault model using the estimated parameter data, to produce updated output; and
determining accuracy of the predicted potential faults, based on the updated output.

13. The method of claim 12, further comprising:
receiving data recordings for the reusable sub-assembly, the data recordings obtained at timed intervals;
identifying a transfer function associated with the reusable sub-assembly, using input and output data for the reusable sub-assembly;
estimating the parameter data associated with the reusable sub-assembly, using the data recordings and the transfer function.

14. The method of claim 12, wherein executing the fault model using the estimated parameter data further comprises:
providing the parameter data as input to the fault model;
executing the fault model to generate output; and
during execution of the fault model, updating the one or more algorithms associated with the reusable sub-assembly, based on the input; and
wherein predicting potential faults of the system is based on comparing the output with a set of recorded fault data.

15. The method of claim 11, further comprising:
executing the one or more algorithms to generate performance indices;
detecting at least one trend of performance for the reusable sub-assembly, wherein the trend is based on the performance indices; and
identifying a time-frame for failure of the component indicated by the at least one trend;
wherein predicting potential faults of the system is based on the time-frame, the potential faults comprising failure of the component.

16. The method of claim 15, further comprising:
presenting an alert advising maintenance for the system, based on predicting the potential faults of the system.

17. A non-transitory, computer-readable medium containing instructions thereon, which, when executed by a processor, perform a method comprising:
adjusting parameters associated with a reusable fault model component of a fault model for a system, using real-time data produced by execution of the fault model, by:
associating one or more algorithms to the reusable fault model component, the one or more algorithms describing behavior of the reusable fault model component, wherein the one or more algorithms comprises at least one of a transfer function, a signal-to-noise ratio, estimated non-linearities, and an error counter; and
incorporating the reusable fault model component and the one or more algorithms into the fault model;
executing the fault model using the adjusted parameters, to produce adjusted output; and
during runtime of the fault model,
recognizing a current regime associated with the reusable fault model component, wherein the current regime provides a context for operation of the reusable fault model component, and wherein the current regime comprises an indication of equipment mode and state affecting a rate at which equipment usage is accumulated, at which fault indications are viewed as legitimate, at which condition indicators are reliable, and at which data needs to be collected;
collecting the data associated with the reusable fault model component, based on the context provided by the current regime;
tuning the reusable fault model component, using available data associated with the fault model; and
predicting remaining life of the system, based on the collected data and the tuning.

18. The non-transitory, computer-readable medium of claim 17, wherein the method further comprises:
creating the reusable fault model component, using a reusable component database and user input;
associating one or more algorithms to the reusable fault model component, the one or more algorithms describing behavior of the reusable fault model component, and the parameters comprising data required to execute the one or more algorithms; and
incorporating the reusable fault model component and the one or more algorithms into the fault model.

19. The non-transitory, computer-readable medium of claim 17, wherein incorporating the reusable fault model component into the fault model further comprises:
determining a set of required parameters for use of the reusable fault model component in the fault model, wherein the set of required parameters comprises data required to execute one or more algorithms associated with the reusable fault model component;
detecting system-defined parameters corresponding to the set of required parameters; and
mapping the set of required parameters to the system-defined parameters.

20. The non-transitory, computer-readable medium of claim 17, wherein incorporating the reusable fault model component into the fault model further comprises:
determining a set of required parameters for use of the reusable fault model component in the fault model, wherein the set of required parameters comprises a subset and a remainder, wherein the set of required parameters comprises data required to execute one or more algorithms associated with the reusable fault model component;
detecting a first group of system-defined parameters corresponding to the subset of the set of required parameters;
mapping the subset to the first group of system-defined parameters;
identifying a second group of system-defined parameters corresponding to algorithms applicable to compute at least one value for the remainder; and
computing the at least one value for the remainder, using the algorithms and the second group of system-defined parameters.

* * * * *